(12) United States Patent
Cicco

(10) Patent No.: US 8,376,292 B2
(45) Date of Patent: Feb. 19, 2013

(54) PERSONAL ELECTRONIC DEVICE HOLDER

(76) Inventor: Mike Cicco, Upland, CA (US)

( * ) Notice: Subject to any disclaimer, the term of this patent is extended or adjusted under 35 U.S.C. 154(b) by 341 days.

(21) Appl. No.: 12/651,467

(22) Filed: Jan. 2, 2010

(65) Prior Publication Data

US 2011/0163211 A1 Jul. 7, 2011

(51) Int. Cl.
*F16M 11/00* (2006.01)

(52) U.S. Cl. ............ 248/176.1; 248/683; 248/688

(58) Field of Classification Search .......... 248/176.1, 248/316.2, 316.1, 309.1, 309.4, 310, 158, 248/157, 125.8, 683, 6, 88, 205.3, 205.4, 248/206.5, 176.3; 379/454
See application file for complete search history.

(56) References Cited

U.S. PATENT DOCUMENTS

| | | | | |
|---|---|---|---|---|
| 5,050,827 A | * | 9/1991 | Christie et al. | 248/125.1 |
| 5,457,745 A | * | 10/1995 | Wang | 379/454 |
| 5,471,530 A | * | 11/1995 | Chen | 379/446 |
| 6,966,533 B1 | * | 11/2005 | Kalis et al. | 248/316.4 |
| 2006/0231714 A1 | * | 10/2006 | Crain et al. | 248/309.1 |
| 2006/0278788 A1 | * | 12/2006 | Fan | 248/309.1 |
| 2009/0173863 A1 | * | 7/2009 | Crown | 248/316.4 |
| 2010/0096396 A1 | * | 4/2010 | Doig et al. | 220/737 |
| 2010/0320341 A1 | * | 12/2010 | Baumann et al. | 248/206.2 |

* cited by examiner

*Primary Examiner* — Ramon Ramirez
(74) *Attorney, Agent, or Firm* — John R. Ross, III

(57) ABSTRACT

The present invention provides a portable electronic device holder. A lower adapter support piece supports two lower adapter arms. An upper adapter arm is supported by a adjustable rod. An adjustment fitting is connected to the lower adapter support piece and the adjustable rod is slidingly connected to the adjustment fitting and can be slid up and down by utilization of finger force. A portable electronic device is mounted and held secure as it is squeezed between the upper adapter arm and the two lower adapter arms. In a preferred embodiment the portable electronic device holder is mounted by either inserting the adjustable rod into a hollow pedestal attached to a base or by attaching the lower adapter arm support piece to a dual T mount of a separate mounting device.

21 Claims, 17 Drawing Sheets

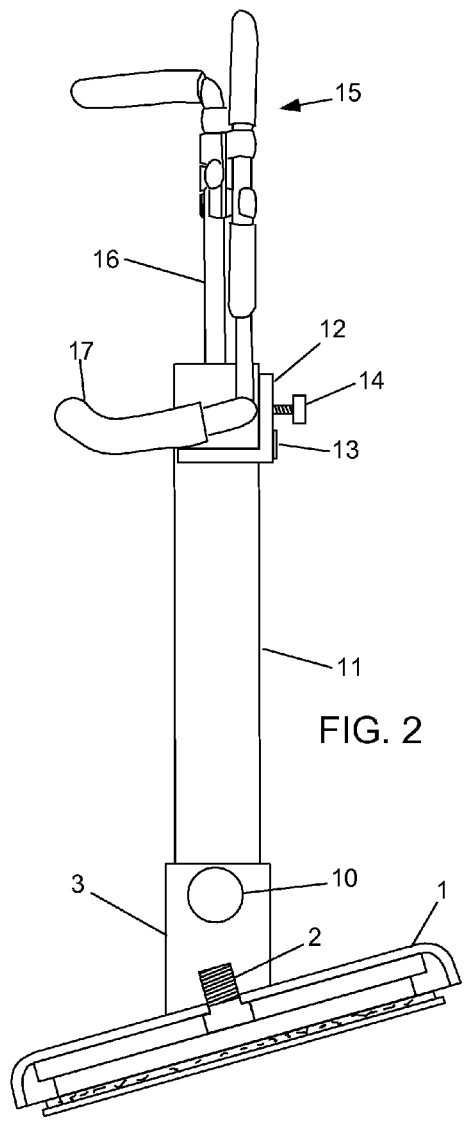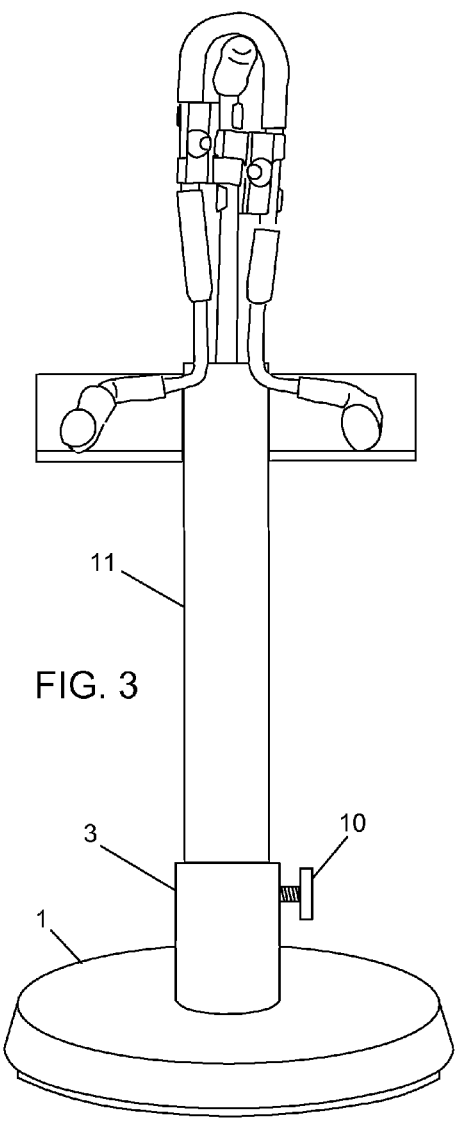

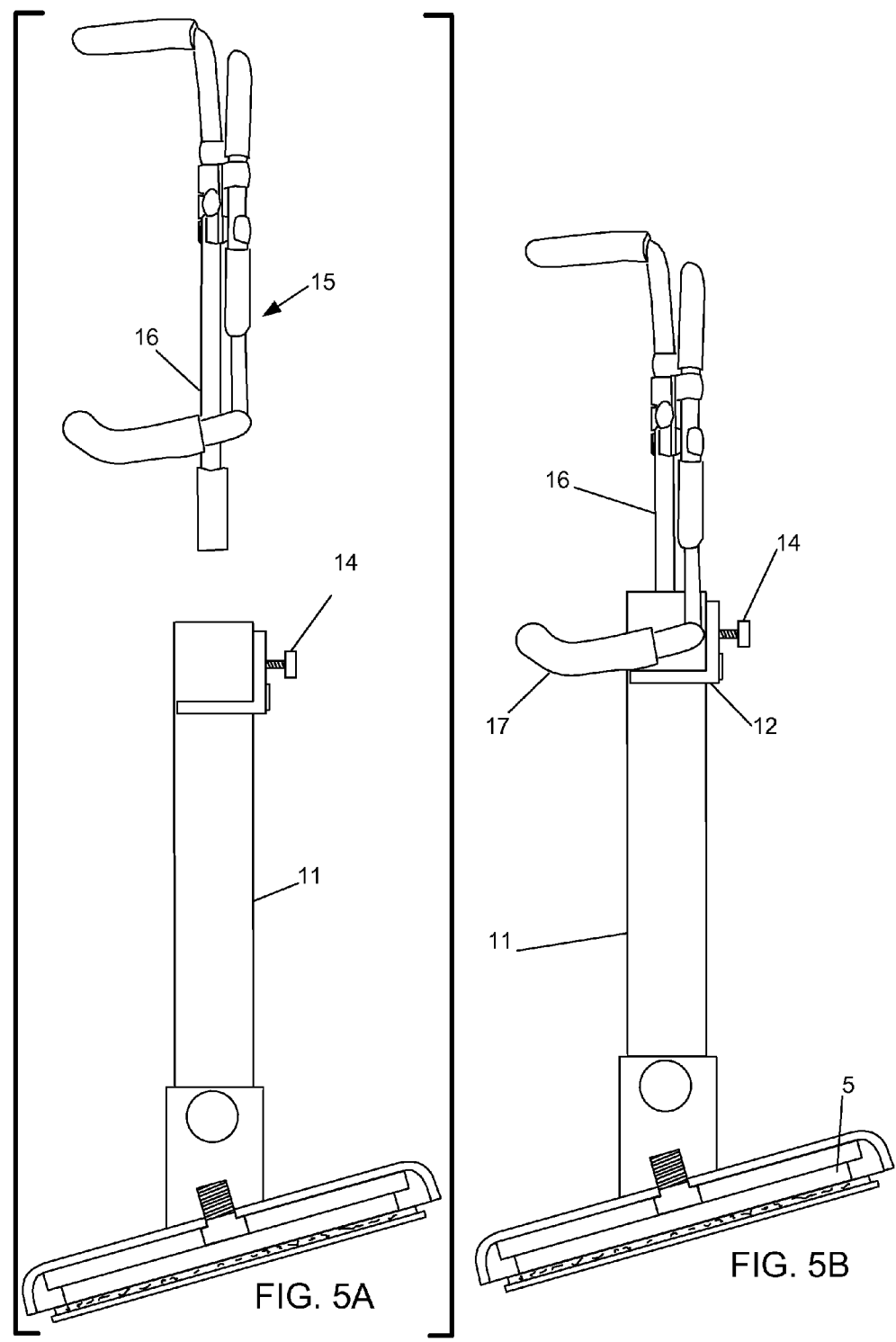

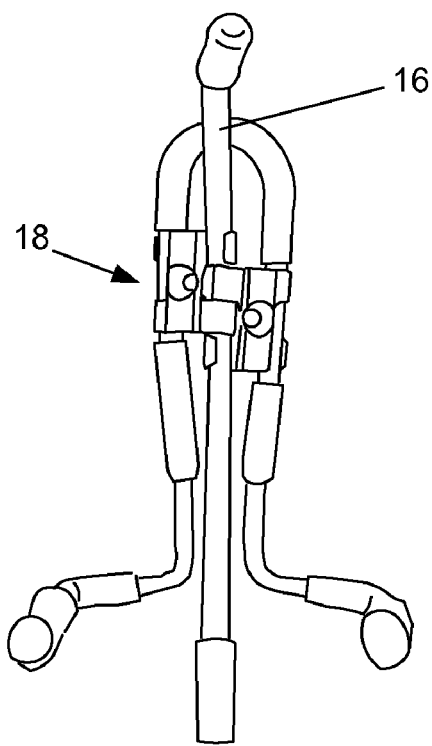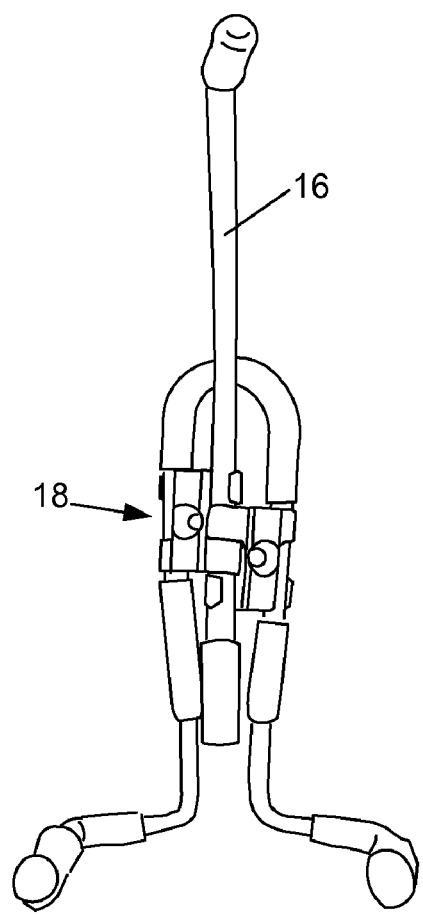
FIG. 6A
FIG. 6B

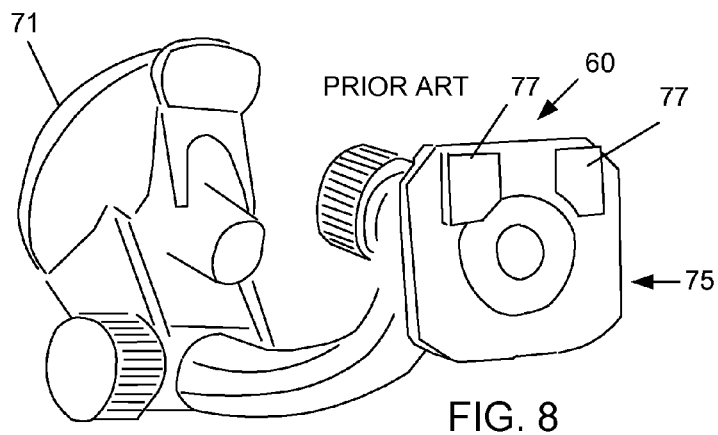
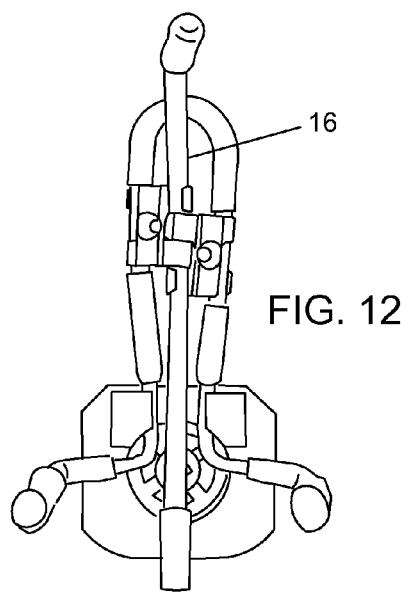
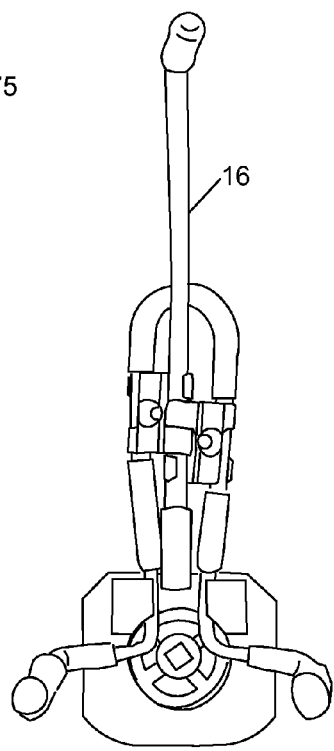
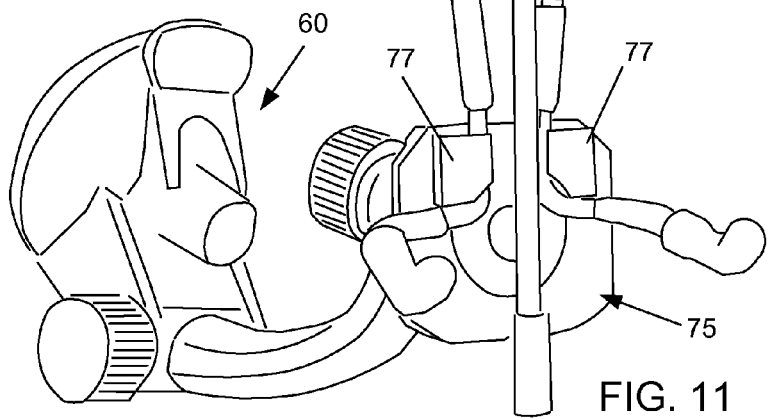
FIG. 8 PRIOR ART
FIG. 12
FIG. 13
FIG. 11

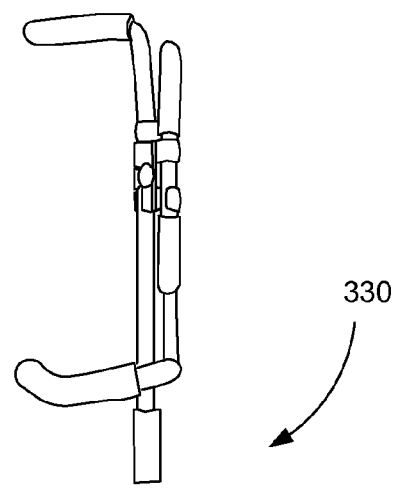
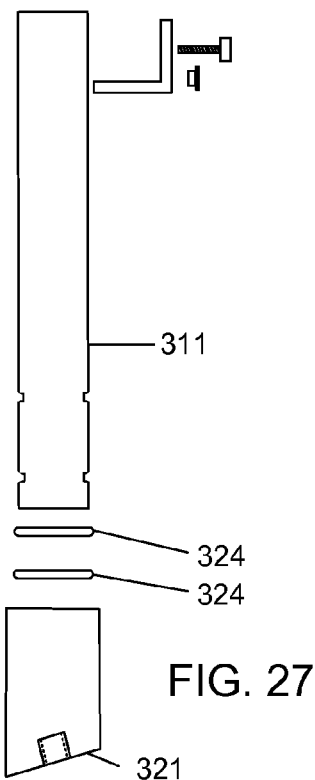
FIG. 27
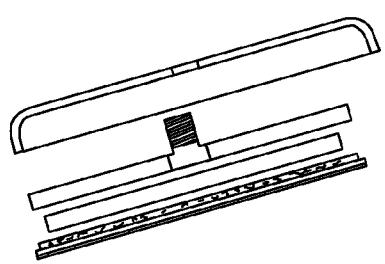

PERSONAL ELECTRONIC DEVICE HOLDER

The present invention relates to personal electronic devices, and in particular, to personal electronic device holders.

BACKGROUND OF THE INVENTION

In recent years hand held portable electronic devices (i.e., cell phones, GPS units, portable game consoles, Personal Digital Assistants (PDA's)) have become increasingly popular. For example, fifteen years ago cell phones were used by CEO's and business executives to track meetings and stock market performance. Now it is common for every member of a family to have their own cell phone with children as young as 8 or 9 carrying them to school. Moreover, the technology of the portable electronic device has blended. No longer is a cell phone just a cell phone, a PDA just a PDA or a portable hand held game console just for playing personal video games. The technologies are intertwined and a user can now use his "cell phone" to make a phone call, upload pictures, play a video game, track his location using a built in Global Positioning System (GPS) technology, surf the Internet, and much more. The use of the personal electronic device has become such a part of personal daily use that it is common for an individual to suffer anxiety if he realizes too late that he has left home and forgotten his cell phone.

An advantage of hand held personal electronic devices is their size and portability. This, however, can also make them difficult to find if the user has set them down. Much like forgetting where the car keys are, the remote control to the television or forgetting where the wallet and check book are, it can be a challenge to always remember the location of the hand held personal electronic device.

Users of personal electronic devices are discovering that mounting devices are very beneficial because they make it easier and more convenient to view the hand held portable electronic device. Prior art mounts are shown in FIGS. 8 and 9. The mount also makes it easier to locate the personal electronic device if the user gets used to keeping his device in the mount.

Unfortunately, however, there are problems with prior art mounts. One problem is that prior art mounts are designed to function in a specific single location. For example an indoor stand will not mount appropriately in an automobile and, likewise, a mount for placement in an automobile air vent cannot be used to mount a device on a user's desk. Also, in the prior art mounts are very specific to each individual hand held portable electronic device. For example, a cell phone has a mount that will fit just that type of cell phone. Or a GPS unit has a mount that will work only with that particular type of GPS unit. It then becomes necessary to provide device specific adapters for use with every different style of mobile device. The user is then forced to buy multiple mount adapters for each of his units. Also, modern smart phones and mobile devices are constantly releasing new applications making it necessary for the user to have his mobile device ready and available at all times. There are currently no device mounts that allow for the user to have constant access to his mobile device to accommodate the ever increasing number of software applications.

Additionally, prior art mounts tend to clamp the cell phone in such a manner that buttons and controls on the sides of the cell phone are obscured. Such problems can be seen by referring to U.S. Pat. No. 5,187,744 issued to Richter, U.S. Pat. No. 5,305,381 issued to Wang et al., and U.S. Pat. No. 6,491,194 issue to Marvin, all of which are incorporated herein by reference. Each of the mounting devices shown in these prior art patents include clamps that are large and unwieldy and are likely to obscure controls and buttons on the side of a user's cell phone, making it difficult to properly operate the mounted cell phone.

What is needed is a better mount for personal hand held electronic devices.

SUMMARY OF THE INVENTION

The present invention provides a portable electronic device holder. A lower adapter support piece supports two lower adapter arms. An upper adapter arm is supported by an adjustable rod. An adjustment fitting is connected to the lower adapter support piece and the adjustable rod is slidingly connected to the adjustment fitting and can be slid up and down by utilization of finger force. A portable electronic device is mounted and held secure as it is squeezed between the upper adapter arm and the two lower adapter arms. In a preferred embodiment the portable electronic device holder is mounted by either inserting the adjustable rod into a hollow pedestal attached to a base or by attaching the lower adapter arm support piece to a dual T mount of a separate mounting device.

BRIEF DESCRIPTION OF THE DRAWINGS

FIGS. 1-3 show a preferred embodiment of the present invention.

FIGS. 5A-5D illustrate the operation of a preferred embodiment.

FIGS. 6A-6B illustrate the operation of a preferred embodiment.

FIG. 8 shows a prior art mounting device.

FIGS. 11-13 show a preferred adapter mounted to the mounting device of FIG. 8.

FIG. 27 shows another preferred embodiment of the present invention.

DETAILED DESCRIPTION OF THE PREFERRED EMBODIMENTS

Figure 1:
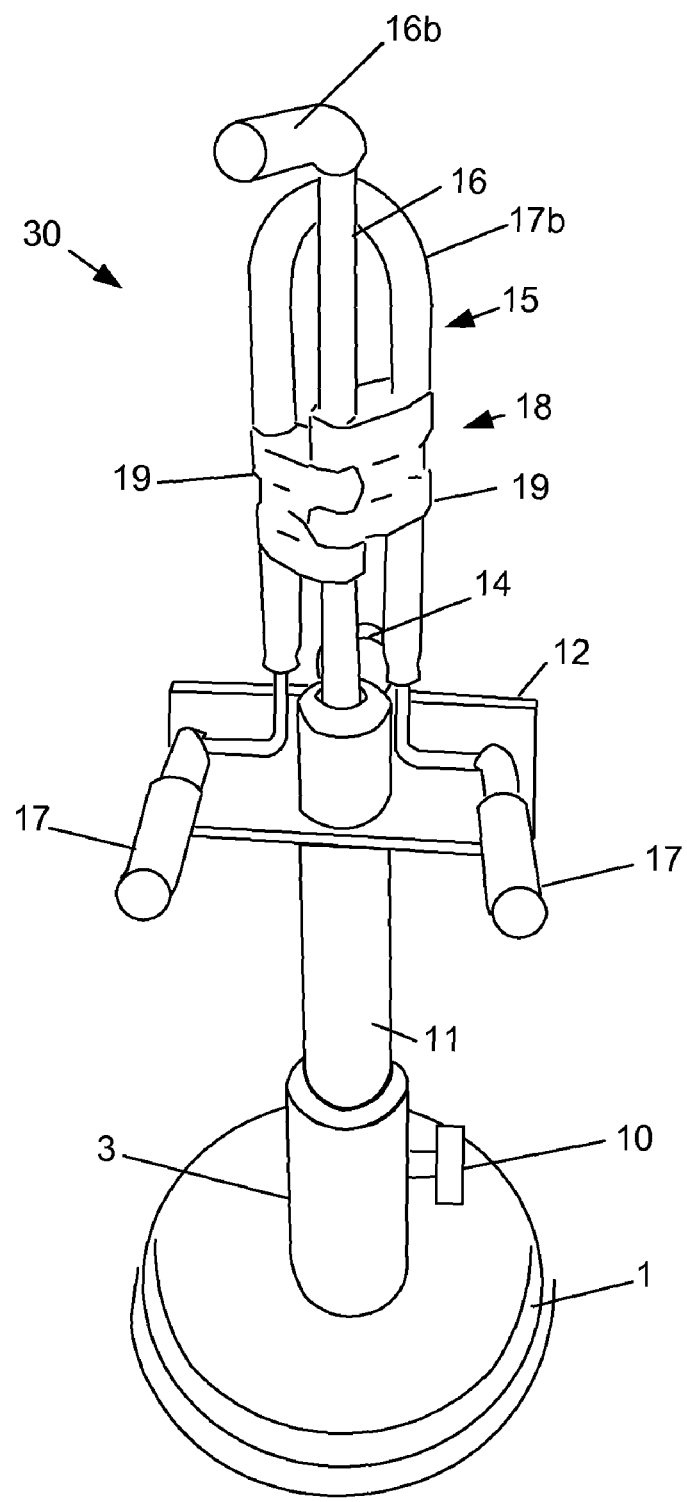

FIG. 1 shows a perspective view of a preferred embodiment of the present invention. In the preferred embodiments, a personal electronic device such as a cell phone is mounted between upper adapter arm 16*b* and lower adapter arms 17. Then, adapter 15 may be inserted into pedestal 11 (FIG. 1) or adapter 15 may be connected to a third party mounting device such as mount 60 (FIGS. 8 and 11).

Attachment of Adapter to the Pedestal and Weighted Base

Weighted Base

Figure 4:
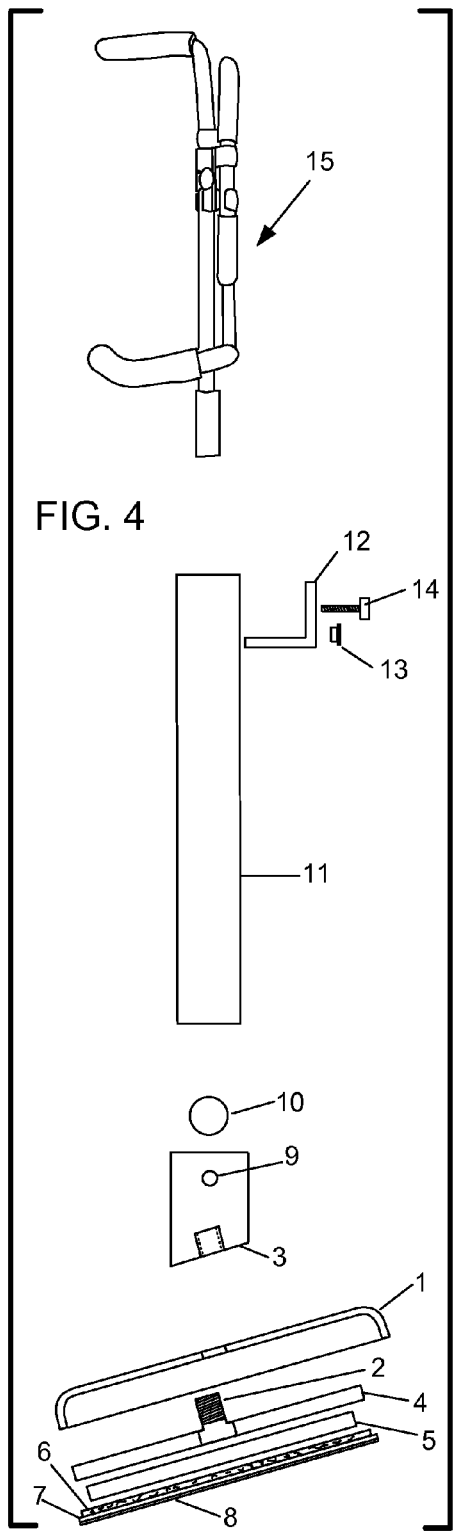
FIG. 4 shows an exploded view of a preferred embodiment of the present invention.
Figure 4D:
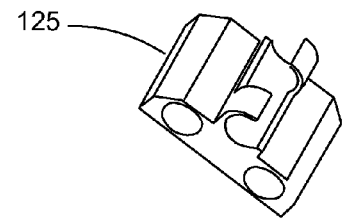
FIG. 4D shows detail of another preferred fitting piece.
Figure 4C:
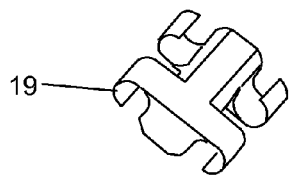
FIG. 4C shows detail of a preferred fitting piece.
Figure 4B:
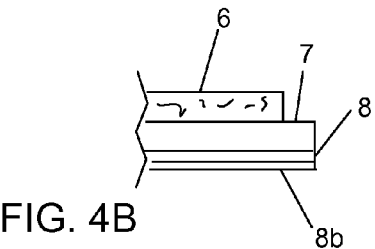
FIG. 4B shows detail of a preferred metal plate.

Base 1 is connected to base fitting 3 via base screw 2 (FIGS. 2, 4). Metal weight 4 is rigidly connected to base screw 2 as shown in FIG. 4. In a preferred embodiment, base screw 2 is press fit into metal weight 4 for the press fit. Base magnet 5 is connected to metal weight 4 via magnetic force. Rubbery padding 6 is adhesively attached to metal plate 7 (FIG. 4B). Adhesive layer 8 is connected to the bottom side of metal plate 7. Wax paper 8b covers adhesive layer 8 until adhesive layer 8 is needed.

Base Fitting

As shown more clearly in FIGS. 2 and 4, base fitting 3 is preferably angled with respect to base 1. Base fitting 3 includes threaded hole 9 to receive set screw 10.

Pedestal

Pedestal 11 is slid into base fitting 3. Once positioned inside base fitting 3, pedestal 11 is tightened by adjusting set screw 10.

Cross Brace

Cross brace 12 is connected to pedestal 11 via rivet 13 (FIG. 2) Set screw 14 is inserted through cross brace 12 and connects to threads through pedestal 11. Set screw 14 also serves to stabilize cross brace 12.

Adapter

Adjustment rod 16 of adapter 15 is inserted into pedestal 11 and secured tightly by adjustment of set screw 14. Upper adapter arm 16b (FIG. 1) is at the upper end of adjustment rod 16. Lower adapter arms 17 are supported by cross brace 12. Lower adapter arms 17 are at the lower end of lower adapter arm support piece 17b. Adjustment fitting 18 includes two fitting pieces 19 (see also FIG. 4C). Each fitting piece 19 is secured tightly to lower adapter arm support piece 17b of adapter 15 as shown. Adjustment rod 16 is slidable within adjustment fitting 18 by application of a user's thumb force. Once adjustment rod 16 has been moved to the desired position by the user's thumb, adjustment rod 16 is held in place by friction force of adjustment fitting 18. For example, in FIG. 6A adjustment rod 16 has been moved to the position shown and is held in place by friction force of adjustment fitting 18. In FIG. 6B, adjustment rod 16 has then been moved upward to the position shown and is held in place again by friction force of adjustment fitting 18.

Example of Adjustment of Position of Adjustment Rod

FIGS. 5A-5D show an example of the Adjustment of the position of adjustment rod 16.

In FIG. 5A, adapter 15 is positioned above pedestal 11. Set screw 14 has been loosened to allow easy insertion of adjustment rod 16.

In FIG. 5B, adjustment rod 16 has been inserted into pedestal 11 so that lower adapter arms 17 are being supported by cross brace 12. Set screw 14 has been tightened against adjustment rod 16 to hold its position stationary.

Figure 5C:
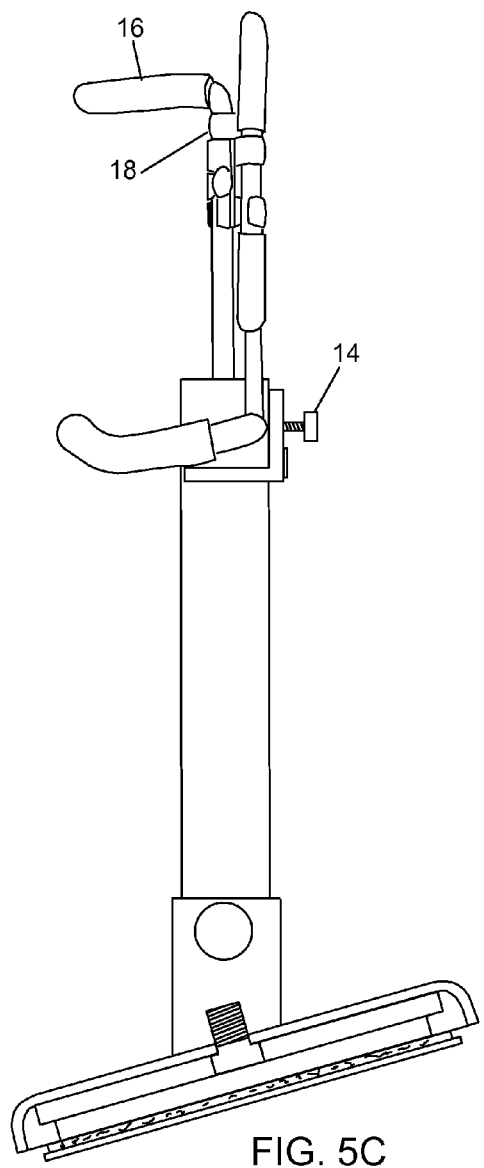

In FIG. 5C, the user has adjusted the position of adjustment rod 16 so that it will fit a smaller sized cell phone. To make the adjustment, the user first loosens set screw 14. He then pushes adjustment rod 16 downward by using thumb force. Once in the proper position shown in FIG. 5C, the user retightens set screw 14.

Figure 5D:
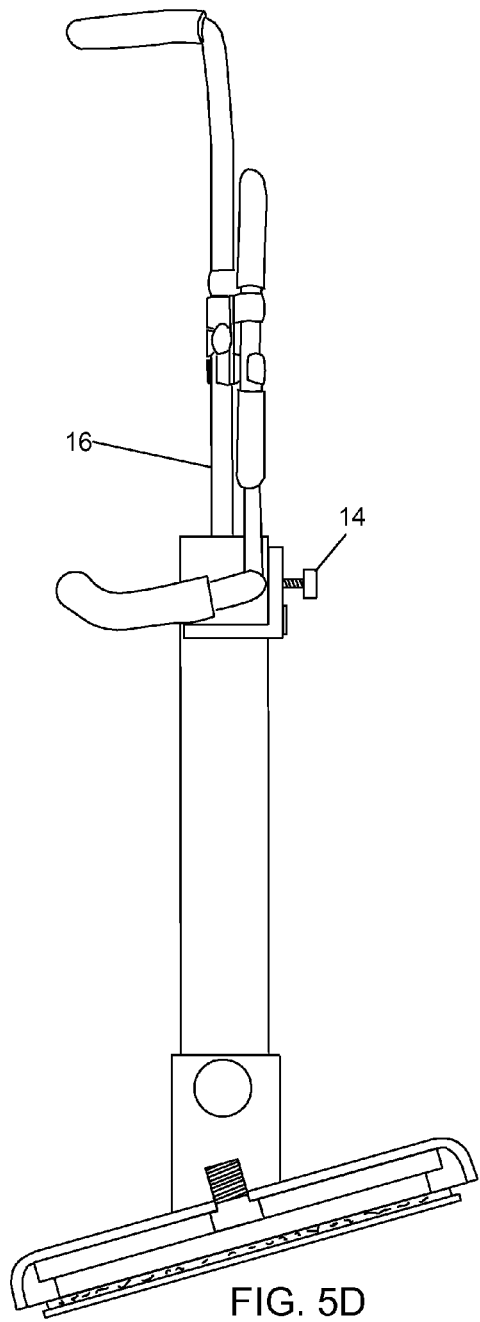

In FIG. 5D, the user has adjusted the position of adjustment rod 16 so that it will fit a larger sized cell phone. To make the adjustment, the user first loosens set screw 14. He then pushes adjustment rod 16 upward by using thumb force. Once in the proper position shown in FIG. 5D, the user retightens set screw 14.

Angle Adjustment Feature

By adjusting the position of base 1 and by rotating pedestal 11 within base fitting 3 the user can obtain the optimum angle for viewing his cell phone. For example, in FIG. 7 the user considers the optimum position for viewing cell phone 55 to be such that the cell phone is approximately parallel with the horizon and such that the screen of the cell phone is approximately perpendicular to the table surface.

Figure 7:
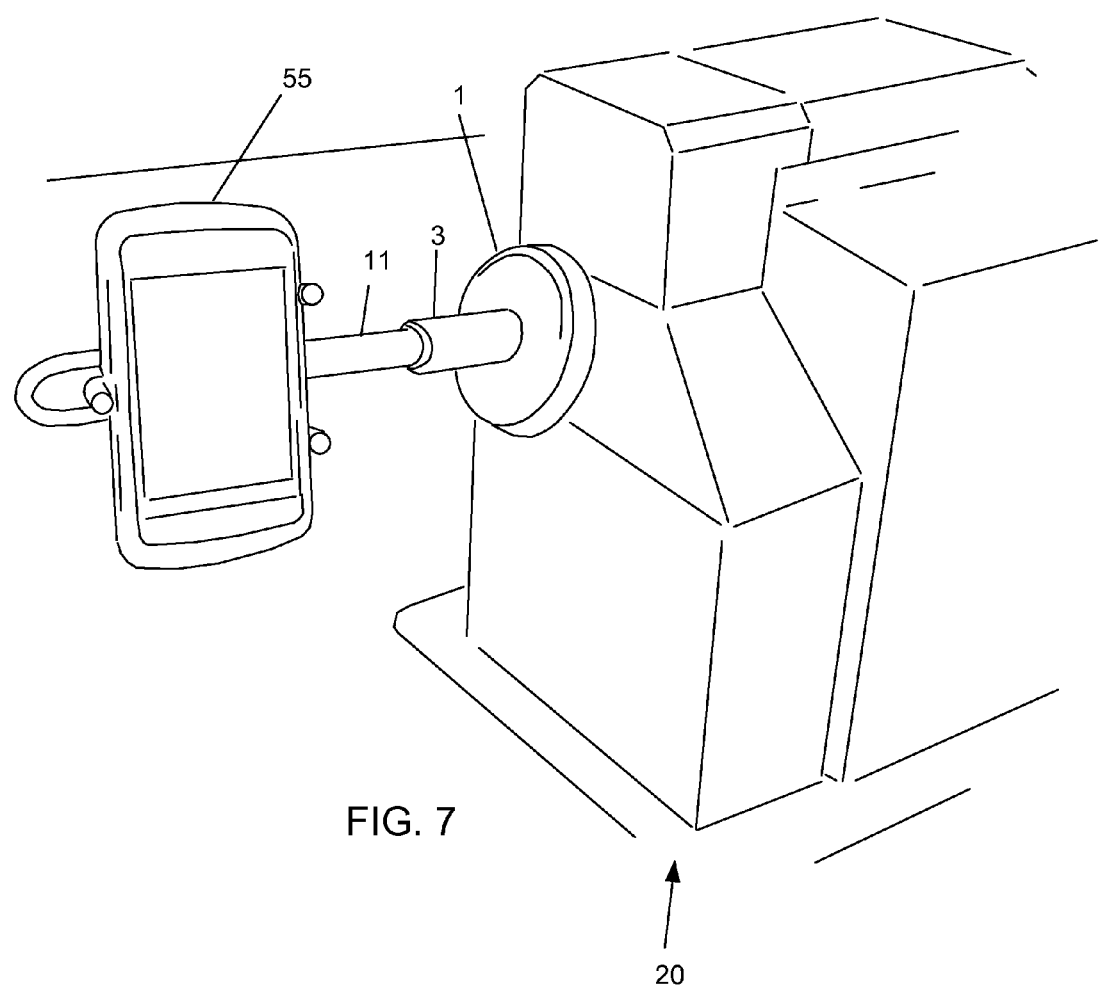
FIG. 7 shows a preferred embodiment mounted to a lathe.

FIG. 7 shows cell phone mount 30 attached to the side of a metal lathe via magnetic force created by base magnet 5 (FIG. 4). First, by rotating base 1 either clockwise or counterclockwise the user has been able to approximately adjust the position of pedestal 11 so that it is parallel to the horizon. Then, by rotating pedestal 11 within base fitting 3 the user has been able to adjust the position of cell phone 55 so that screen is approximately perpendicular to the floor.

Positioning the Cell Phone Mount

Cell phone mount 30 with adapter 15 is extremely versatile and allows for optimum positioning of the user's cell phone.

Weighted Base for Mounting on a Flat Surface

As shown in FIGS. 1-4, metal weight 4 provides sufficient weight to allow cell phone mount 30 to just be placed on a table for easy mounting of a cell phone. The weight of the base stabilizes the cell phone and prevents it from toppling over. Moreover, magnet 5 and metal plate 7 provide additional weight for stability.

Adhesive for Mounting on a Flat Surface

For a more permanent arrangement, adhesive layer 8 (FIG. 4B) can be utilized for mounting cell phone mount 30 onto any non-metal flat surface such as a table, wall, side of a large tool, or the side of, or underneath a cabinet.

Figure 26:
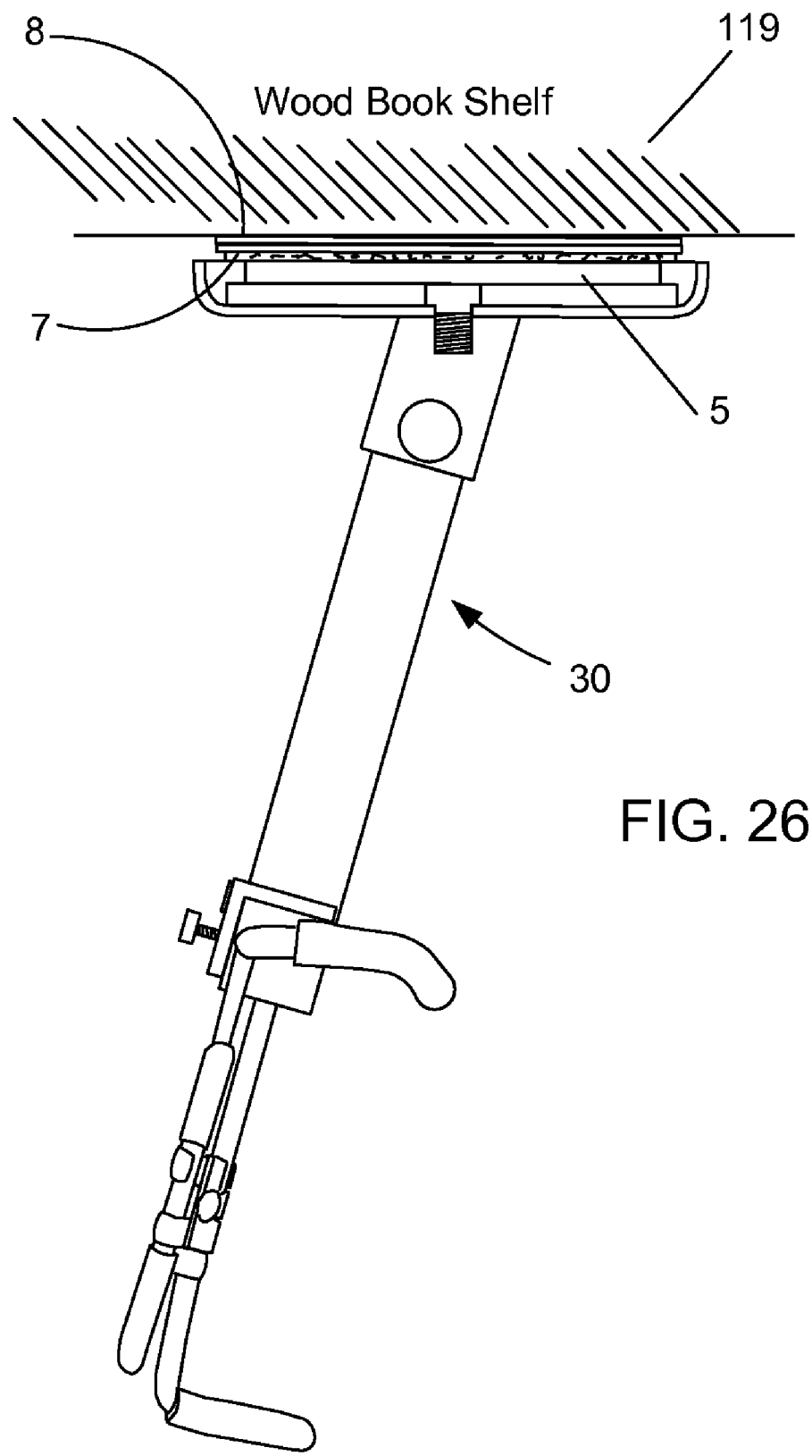

For example, FIG. 26 shows cell phone mount 30 attached to the underside of wood overhang 119. Wax paper 8b (FIG. 4b) has been removed and metal plate 7 has been attached to wood overhang 119 via adhesive layer 8. Magnetic force from magnet 5 is felt through rubber padding 6 to attract metal plate 7 and to properly secure cell phone mount 30 as shown.

Magnetic Force for Mounting

Figure 14:
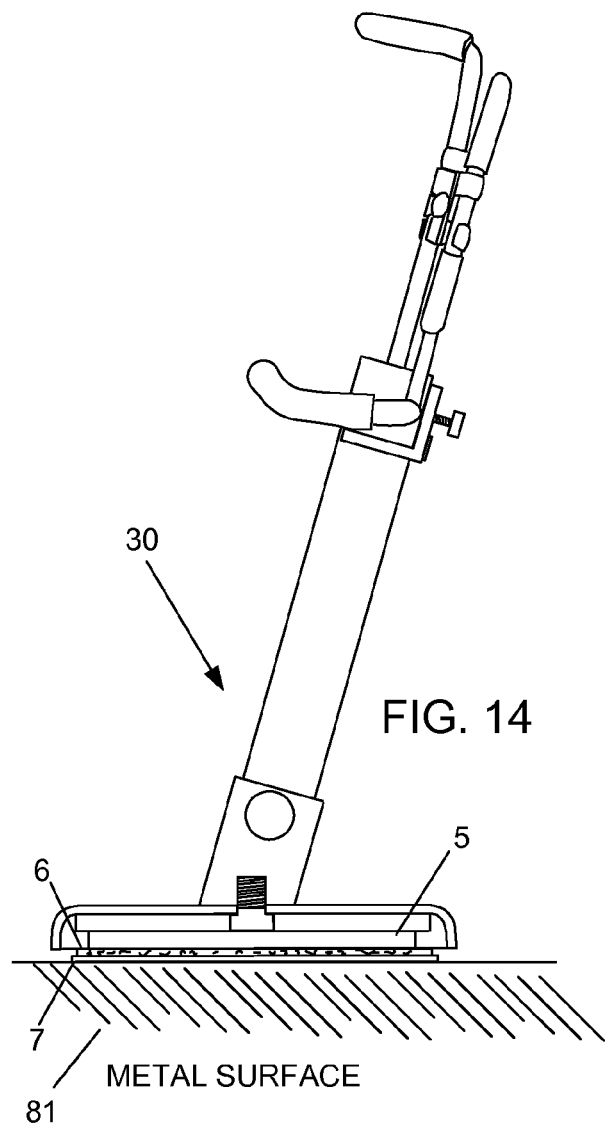
FIGS. 14-17 show the mounting of a preferred embodiment.

Magnetic force created by magnet 5 (FIG. 5B) can also be utilized for mounting cell phone mount 30. For example, FIG. 14 shows cell phone mount 30 attached to metal surface 81 through magnetic force from magnet 5. The magnetic force from magnet 5 is felt through rubber padding 6 and metal plate 7.

Figure 15:
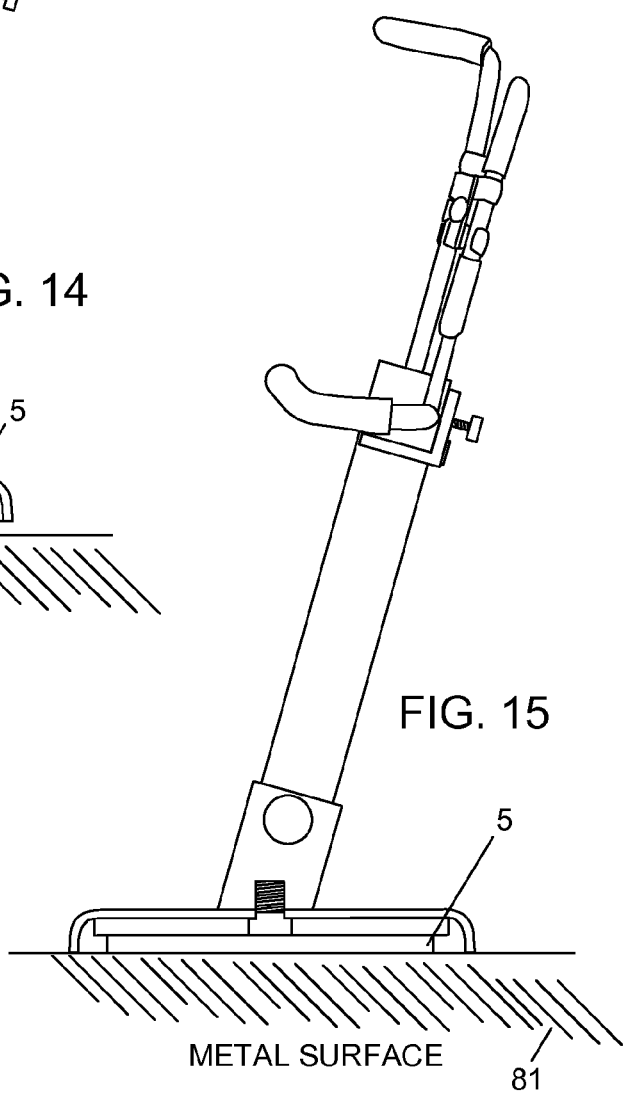

In FIG. 15, the user has recognized that rubber padding 6 and metal plate 7 are not needed and has removed them from cell phone mount 30. A greater magnetic force is felt in that magnet 5 is in direct contact with metal surface 81.

Figure 16:
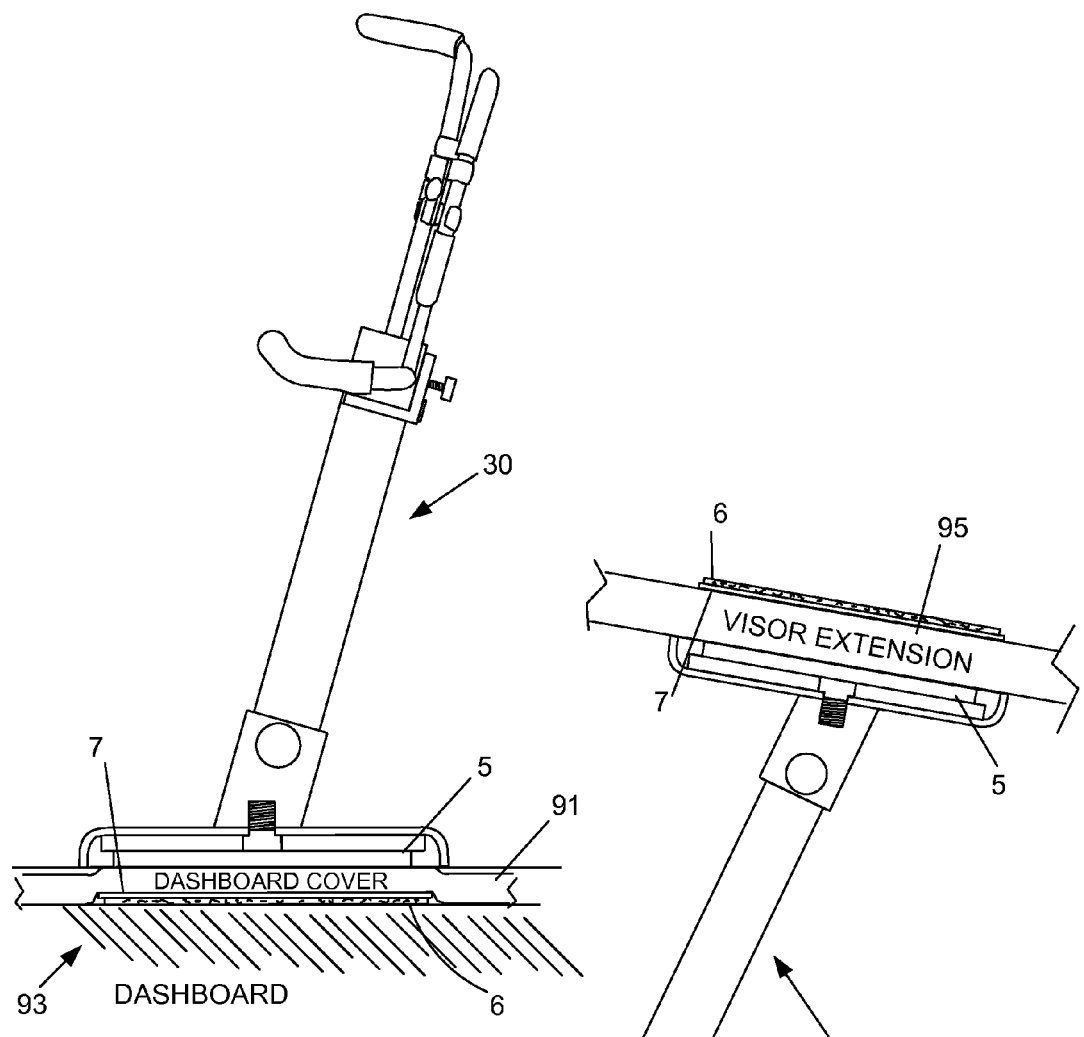

In FIG. 16, the user has mounted cell phone mount 30 to the top of dashboard 93. The user has placed metal plate 7 under dashboard cover 91. Magnetic force from magnet 5 is felt through dashboard cover 91 to attract metal plate 7 and to properly secure cell phone mount 30 as shown.

Figure 17:
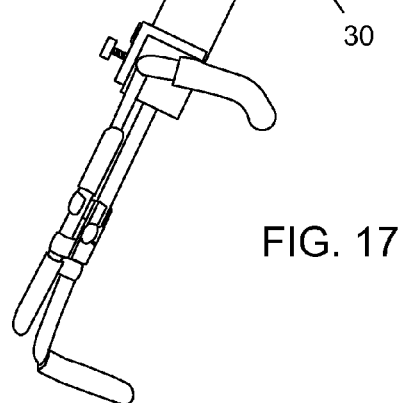

In FIG. 17, the user has mounted cell phone mount 30 to visor extension 95. The user has placed metal plate 7 behind visor extension 95. Magnetic force from magnet 5 is felt through visor extension 95 to attract metal plate 7 and to properly secure cell phone mount 30 as shown.

Figure 24:
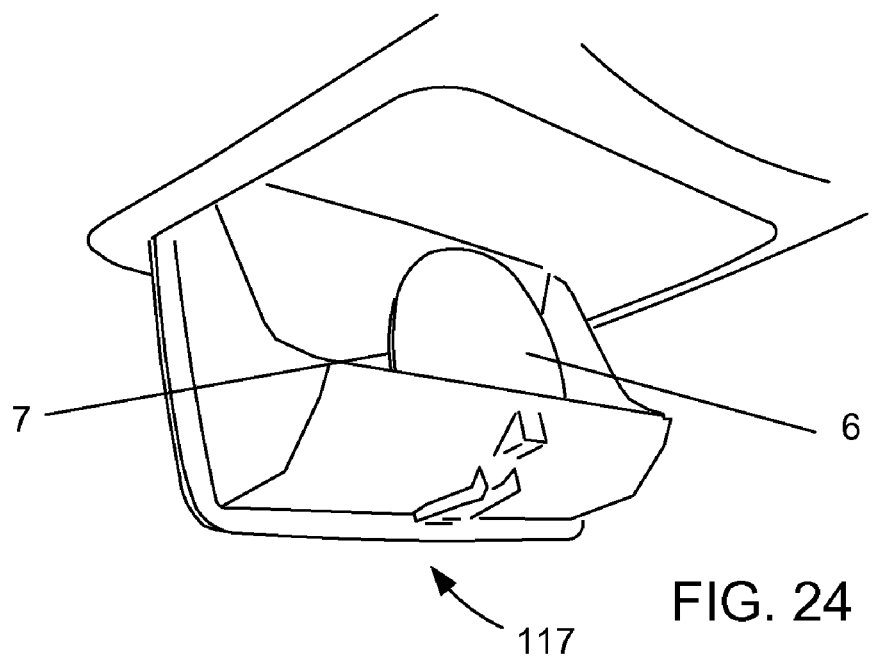
FIGS. 24-26 show the mounting of a preferred embodiment.
Figure 25:
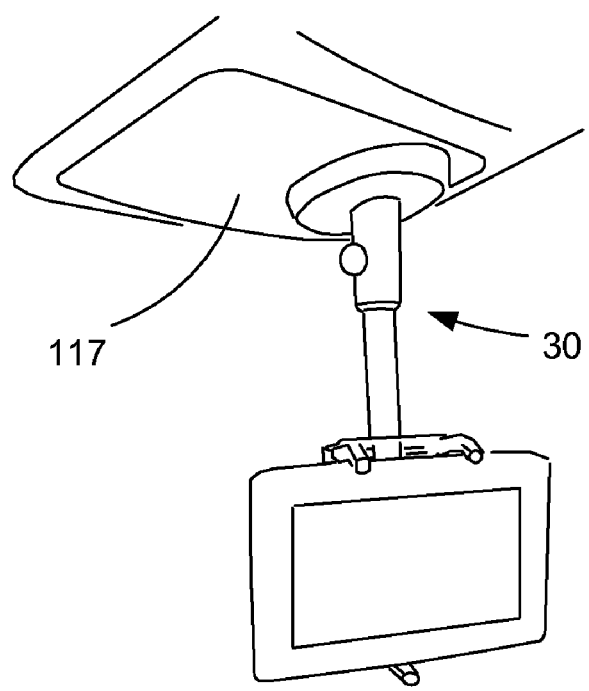

In FIG. 24, the user has placed metal plate 7 with rubber padding 6 into automobile ceiling compartment hatch 117 as shown. In FIG. 25, the user has closed the hatch and has placed cell phone mount 30 adjacent to ceiling compartment hatch 117 as shown. Magnetic force from magnet 5 is felt through ceiling compartment hatch 117 to attract metal plate 7 and to properly secure cell phone mount 30 as shown.

Modifications to Base

Figure 18:
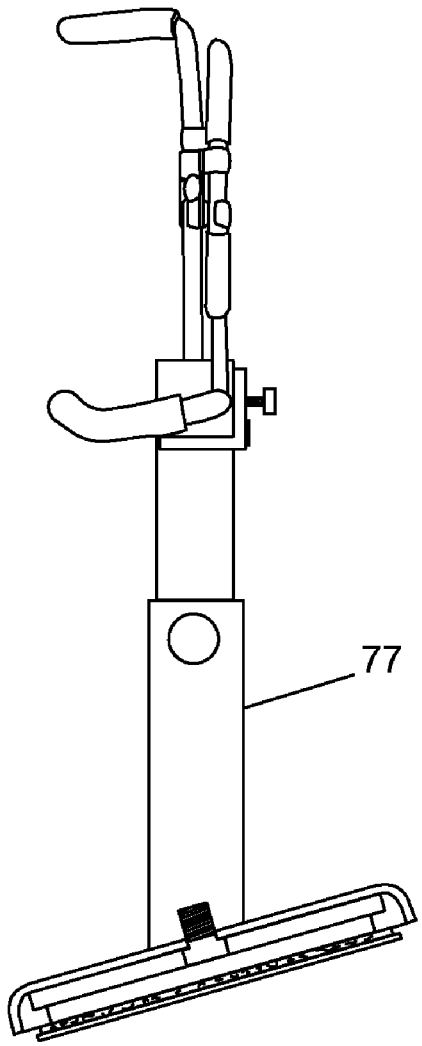
FIGS. 18-21 show other preferred embodiments of the present invention.

FIG. 18 shows another preferred embodiment that includes a taller base fitting 77.

Figure 19:
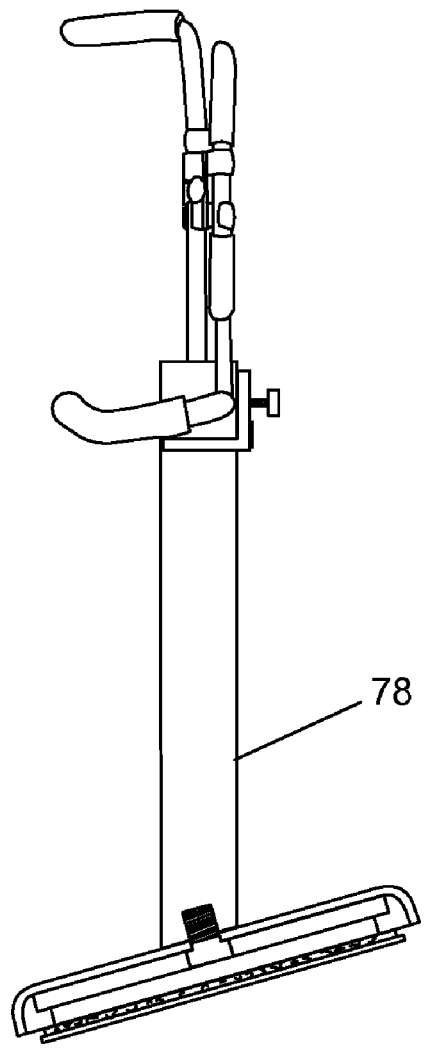

FIG. 19 shows another preferred embodiment in which the base fitting has been eliminated and base screw 2 threads directly onto pedestal 78.

Figure 20:
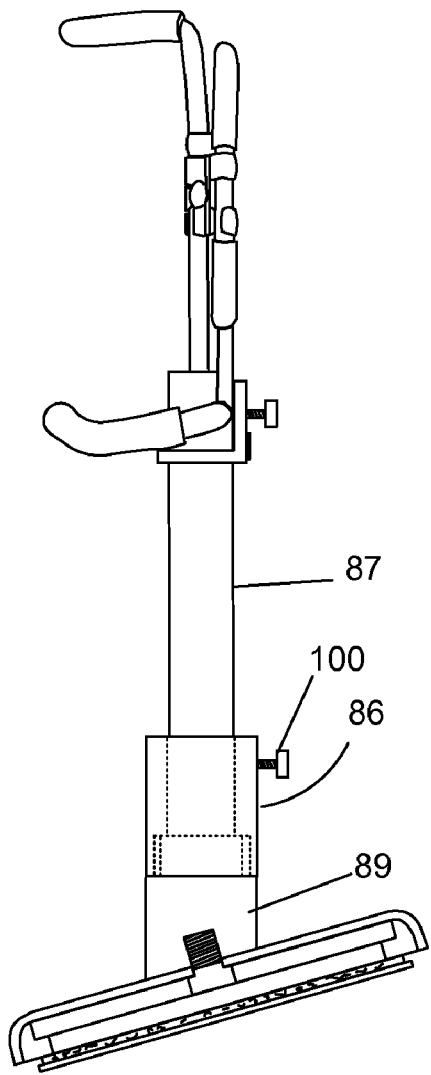
Figure 21:
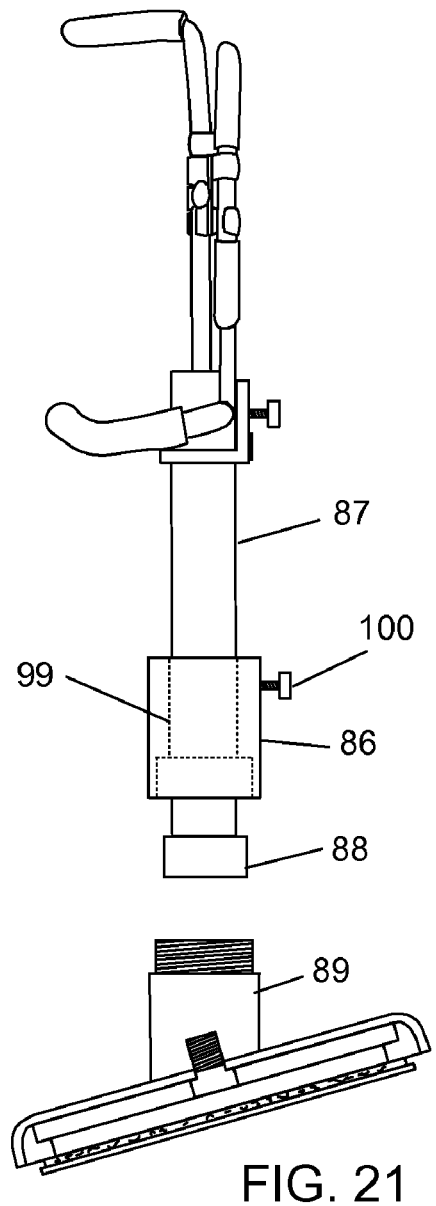

FIGS. 20-21 show an embodiment that allows for a more secure method of attaching the pedestal to the base fitting. Upper base fitting 86 is slidingly attached to pedestal 87. Pedestal 87 includes lower section 88. Lower section 88 has a diameter greater than the internal diameter of opening 99 of upper base fitting 86. As shown in FIG. 20, upper base fitting 86 is threaded onto lower base fitting 89. The user loosens set screw 100 in order to freely rotate pedestal 87. When pedestal 87 is in the desired position, the user tightens set screw 100 to secure the pedestal and keep it from further rotation.

Modification to Rubber Padding

Figure 4E:
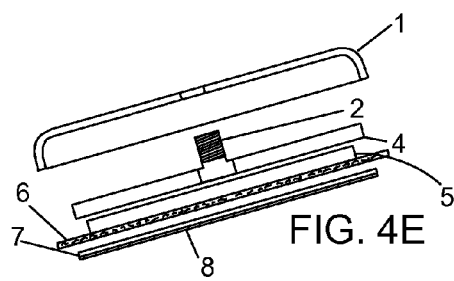
FIG. 4E shows another preferred embodiment of the present invention.

FIG. 4E shows a modification to rubber padding 6. In FIG. 4E, rubber padding 6 has been adhesively attached to magnet 5. The embodiment shown in FIG. 4E is preferred for providing traction to cell phone mount 30. For example, in FIGS. 24-25 cell phone mount 30 is attached to compartment hatch 117 as explained above. As the automobile is driven compartment hatch 117 experiences vibration. The vibration is transferred to cell phone mount 30. Utilizing the embodiment shown in FIG. 4E, rubber padding 6 provides traction as it is pressed against the bottom of compartment hatch 117. The traction helps prevent unwanted motion of cell phone mount 30 due to the vibration.

Adjustment Rod

Figures 22, 23:
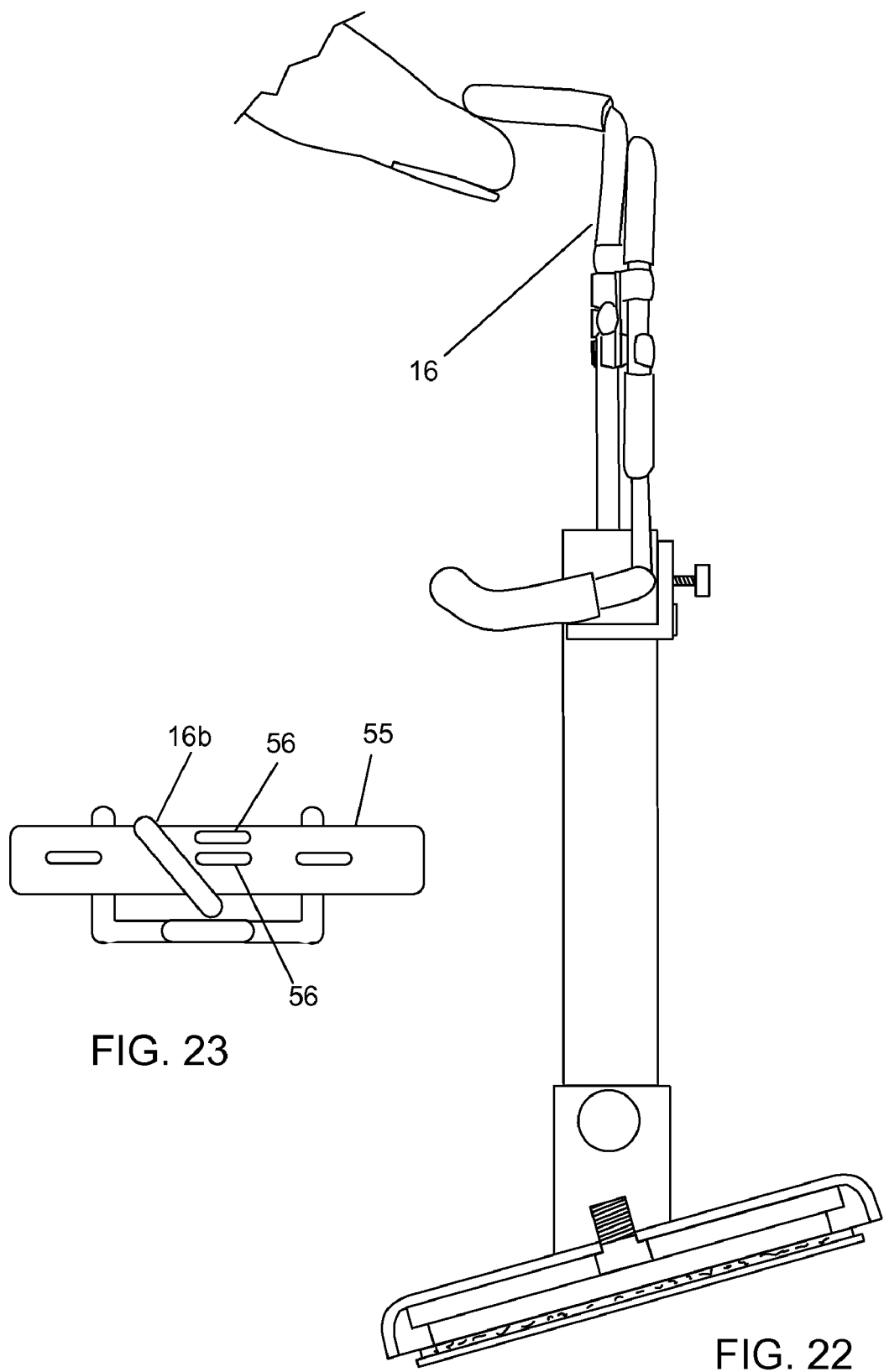
FIGS. 22-23 show the operation of a preferred adjustment rod.

Adjustment rod 16 is preferably bendable to allow for optimum cell phone fit. In a preferred embodiment, adjustment rod 16 is fabricated from 13 gauge metal wire. FIG. 22 shows the user bending adjustment rod 16 with his finger. In another preferred embodiment, adjustable rod 16 has spring-like flexibility and is fabricated from a flexible thermoplastic, such as Delrin®. Delrin® is a registered trademark of the Du Pont Corporation.

Adjustment rod 16 is also rotatable. For example, FIG. 23 shows that the user has adjusted the position of adjustment rod 16 by rotating it counterclockwise. This rotation was made so that upper adapter arm 16b could avoid cell phone buttons and controls 56.

Attachment of Adapter to Other Mounting Devices

Adapter 15 is designed to attach to pedestal 11, as described in the above preferred embodiments. In the preferred embodiments, adapter 15 is also to be able to attach to other mounting devices. This makes adapter 15 extremely versatile and useful for a variety of applications. For example, in recent years it has become very common to use handheld GPS navigation systems in automobiles. The advantage of a handheld GPS system is that it can be transferred between automobiles or even used on other devices such as a bicycle, boat or motorcycle. After market companies manufacture and sell mounting devices that can be mounted to a variety of locations within an automobile.

Figure 10:
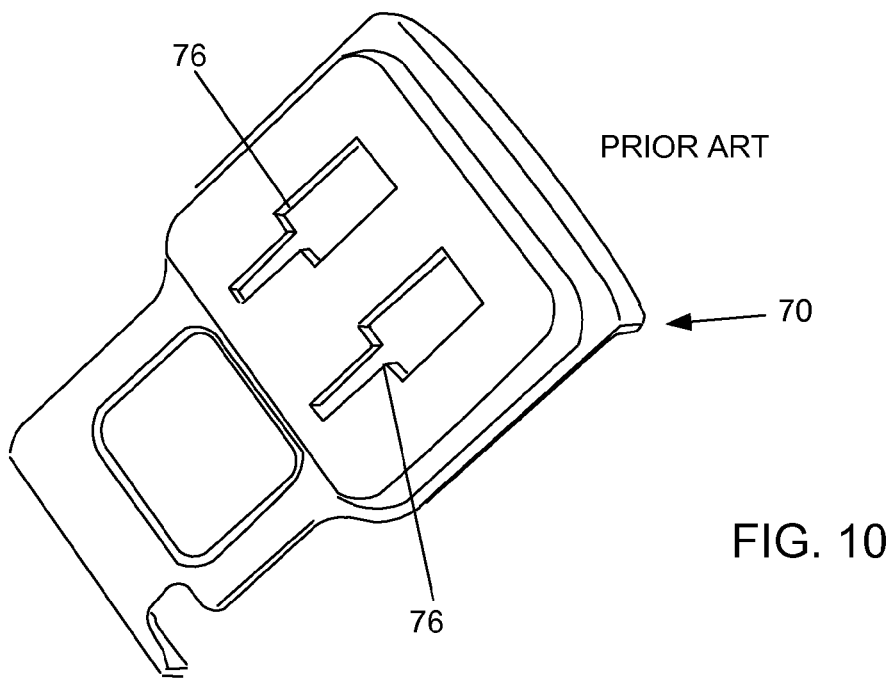
FIG. 10 shows a prior art GPS device adapter.

For example, FIG. 8 shows prior art mounting device 60 for mounting prior art handheld GPS device adapter 70 (FIG. 10) on the windshield of an automobile by utilization of suction cup 71. FIG. 10 shows a rear perspective view of prior art handheld GPS device adapter 70. In the prior art a GPS device of the appropriate size is snap fit into the front side of prior art handheld GPS device adapter 70 so that the GPS device can be mounted to prior art mounting device 60.

Figure 9:
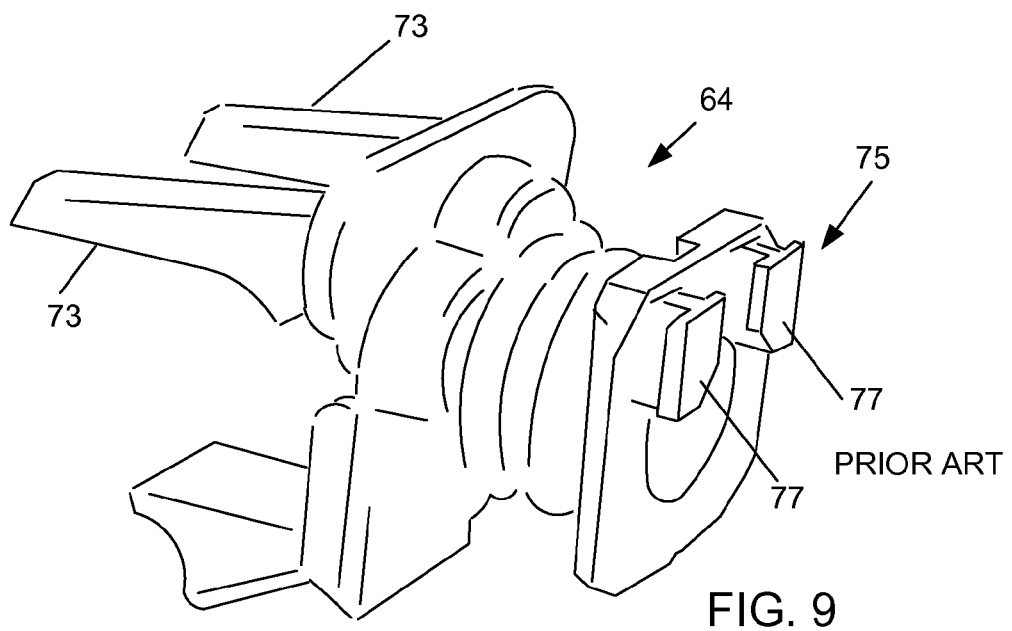
FIG. 9 shows another prior art mounting device.

FIG. 9 shows prior art mounting device 64 for mounting a mobile device that has been mounted into prior art handheld GPS device adapter 70 to the air vent of an automobile by utilization of extensions 73. In FIGS. 8, 9 and 10, all three prior art mounting devices 60, 64, and 70 are manufactured by Arkon Resources, Inc. with offices in Arcadia, Calif. Prior art mounting devices 60 and 64 include dual T mounts 75. A GPS device mounted into a GPS device adapter 70 attaches to mounting devices 60 and 64 by positioning mounting slots 76 (FIG. 10) over mounting tabs 77 of dual T mount 75.

In a preferred embodiment of the present invention, the user removes prior art handheld GPS device adapter 70 from mounting device 60. The user can then attach adapter 15 to mounting tabs 77 of dual T mount 75 as shown in FIG. 11. The user can adjust the position of adjustment rod 16 by utilization of thumb force. For example, FIG. 12 shows adjustment rod 16 positioned for a medium sized cell phone. FIG. 13 shows adjustment rod 16 positioned for a larger sized cell phone.

Modified Pedestal

FIG. 27 shows an exploded view of another preferred embodiment of the present invention in which the attachment of the pedestal to the base fitting is simplified. Cell phone mount 330 includes pedestal 311. Pedestal 311 is slid into base fitting 321 and held in place by friction force from O-rings 324.

Although the above-preferred embodiments have been described with specificity, persons skilled in this art will recognize that many changes to the specific embodiments disclosed above could be made without departing from the spirit of the invention. For example, although the above preferred embodiments referred to the usage of cell phone mount 30 with cell phones, it should be understood that cell phone mount 30 can be utilized with any type of personal hand held electronic device. For example, it can be utilized to hold game consoles, PDA'a, GPS units, or eBook readers. Also, it should noted that adjustment fitting 125 (FIG. 4D) could be utilized in place of adjustment fitting 18 (FIG. 1) to achieve similar results. Therefore, the attached claims and their legal equivalents should determine the scope of the invention.

What is claimed is:

1. A portable electronic device holder for holding a portable electronic device, comprising:
    A) two lower adapter arms,
    B) a lower adapter arm support piece connected to said two lower adapter arms,
    C) an upper adapter arm,
    D) an adjustable rod connected to said upper adapter arm,
    E) an adjustment fitting attached to said lower adapter arm support piece, and wherein said adjustable rod is slidingly connected to said adjustment fitting,
    wherein said portable electronic device is squeezed between said upper adapter arm and said two lower adapter arms,
    F) a base,
    G) a hollow pedestal attached to said base, and
    H) a cross brace attached to said pedestal,
    wherein said adjustable rod is inserted into said hollow pedestal and wherein said two lower adapter arms are supported by said cross brace.

2. The portable electronic device holder as in claim 1 further comprising a set screw threaded into said hollow pedestal and tightened against said adjustment rod to hold said adjustment rod steady.

3. The portable electronic device holder as in claim 1, wherein said base is a weighted base.

4. The portable electronic device holder as in claim 1, wherein said base further comprises:
    A) a metal weight for increasing the weight of said base, and
    B) a magnet magnetically attached to said weight, said magnet for providing a means for attaching said portable electronic device holder to a metal surface.

5. The portable electronic device holder as in claim 4, further comprising a removable metal plate, wherein said portable electronic device is attached to a non-metallic object by sandwiching said non-metallic object between said magnet and said removable metal plate.

6. The portable electronic device holder as in claim 5, wherein said non-metallic object is an automobile dash cover.

7. The portable electronic device holder as in claim 5, wherein said non-metallic object is an automobile visor extension.

8. The portable electronic device holder as in claim 5, wherein said non-metallic object is an automobile ceiling compartment hatch.

9. The portable electronic device holder as in claim 1, further comprising:
    A) a hollow base fitting,
    B) a base screw for connecting said base to said hollow base fitting, and
    C) a base set screw threaded into said hollow base fitting, wherein said pedestal is inserted into said hollow base fitting, wherein said base set screw is tightened against said pedestal to hold said pedestal steady.

10. The portable electronic device holder as in claim 9, wherein said hollow base fitting is tiltedly attached to said base, wherein the angle of said portable electronic device is adjusted by rotating said pedestal inside said hollow base fitting and by rotating the position of said base on the mounting surface.

11. The portable electronic device holder as in claim 5, further comprising an adhesive surface attached to said removable metal plate.

12. The portable electronic device holder as in claim 11, wherein said removable metal plate is adhesively attached to a non-metallic surface.

13. The portable electronic device holder as in claim 1 wherein said adjustment rod is rotated so that said upper adapter arm avoids controls and buttons on said portable electronic device.

14. The portable electronic device holder as in claim 1, wherein said adjustment rod is bendable.

15. The portable electronic device holder as in claim 1, wherein said lower adapter arm support piece is mounted to a dual T mount.

16. The portable electronic device holder as in claim 15, wherein said lower adapter arm support piece is press fit into the tabs of a dual T mount.

17. The portable electronic device holder as in claim 15, wherein said dual T mount is connected to a GPS mounting device.

18. The portable electronic device holder as in claim 15, wherein said GPS mounting device is mounted inside an automobile.

19. The portable electronic device holder as in claim 1 wherein said pedestal comprises a larger diameter lower section at the lower end of said pedestal, said portable electronic device holder further comprising:
    A) a hollow lower base fitting with attachment threads,
    B) an upper base fitting threaded onto said attachment threads
    C) a base screw for connecting said base to said lower hollow base fitting, and
    D) a base set screw threaded into said upper base fitting, wherein said upper base fitting prevents upward movement of said larger diameter lower section while said pedestal is being rotated.

20. The portable electronic device holder as in claim 1, wherein said portable electronic device is a cell phone.

21. A portable electronic device holder for holding a portable electronic device, comprising:
    A) two lower adapter arms,
    B) a lower adapter arm support piece connected to said two lower adapter arms,
    C) an upper adapter arm, wherein said portable electronic device is squeezed between said upper adapter arm and said two lower adapter arms,
    D) an adjustable rod connected to said upper adapter arm,
    E) an adjustment fitting attached to said lower adapter arm support piece, and wherein said adjustable rod is slidably connected to said adjustment fitting,
    F) a base,
    G) a hollow pedestal attached to said base, and
    H) a cross brace attached to said pedestal, wherein said two lower adapter arms are supported by said cross brace,
    wherein said adjustable rod may be either inserted into said hollow pedestal for mounting said portable electronic device holder or wherein said lower adapter arm support piece may be attached to a dual T mount for mounting said portable electronic device holder.

* * * * *